United States Patent
Held et al.

(10) Patent No.: US 6,934,765 B2
(45) Date of Patent: Aug. 23, 2005

(54) METHOD AND ARRAY FOR DETERMINING THE VIRTUAL ADDRESS OF A TERMINAL

(75) Inventors: Walter Held, Geretsried (DE); Volker Mendisch, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/433,950

(22) PCT Filed: Jan. 23, 2002

(86) PCT No.: PCT/DE02/00223

§ 371 (c)(1),
(2), (4) Date: Dec. 3, 2003

(87) PCT Pub. No.: WO02/065725

PCT Pub. Date: Aug. 22, 2002

(65) Prior Publication Data

US 2004/0081161 A1 Apr. 29, 2004

(30) Foreign Application Priority Data

Feb. 13, 2001 (DE) .......................................... 101 06 586
Oct. 2, 2001 (DE) .......................................... 101 48 627

(51) Int. Cl.[7] ............................................. G06F 15/16
(52) U.S. Cl. ........................ 709/245; 709/220; 709/223; 370/392; 370/395.3
(58) Field of Search ................................ 709/223, 227, 709/245, 220; 370/392, 395.3, 474, 475, 401

(56) References Cited

U.S. PATENT DOCUMENTS

| 6,012,088 A | * | 1/2000 | Li et al. ...................... 709/219 |
| 6,073,176 A | * | 6/2000 | Baindur et al. ............. 709/227 |
| 6,073,178 A | | 6/2000 | Wong et al. |
| 6,091,951 A | * | 7/2000 | Sturniolo et al. ........ 455/432.2 |
| 6,714,981 B1 | * | 3/2004 | Skaggs et al. .............. 709/227 |
| 6,747,979 B1 | * | 6/2004 | Banks et al. ................ 370/401 |

FOREIGN PATENT DOCUMENTS

WO       IB-96/39769 A1    12/1996

* cited by examiner

*Primary Examiner*—Frantz B. Jean
(74) *Attorney, Agent, or Firm*—Morrison & Foerster LLP

(57) ABSTRACT

The invention relates to a method, a network management unit for assigning virtual addresses and a network termination unit for determining virtual addresses of a terminal unit that is connected by means of a terminal connection and a subscriber-side network termination unit of a virtual network. A network management unit transmits a second identifier assigned to the terminal connection together with virtual addresses of the network termination unit in order to assign virtual addresses of the network termination unit in response to its address request messages. A virtual address requested with said second identifier is used as virtual address of the terminal unit.

12 Claims, 4 Drawing Sheets

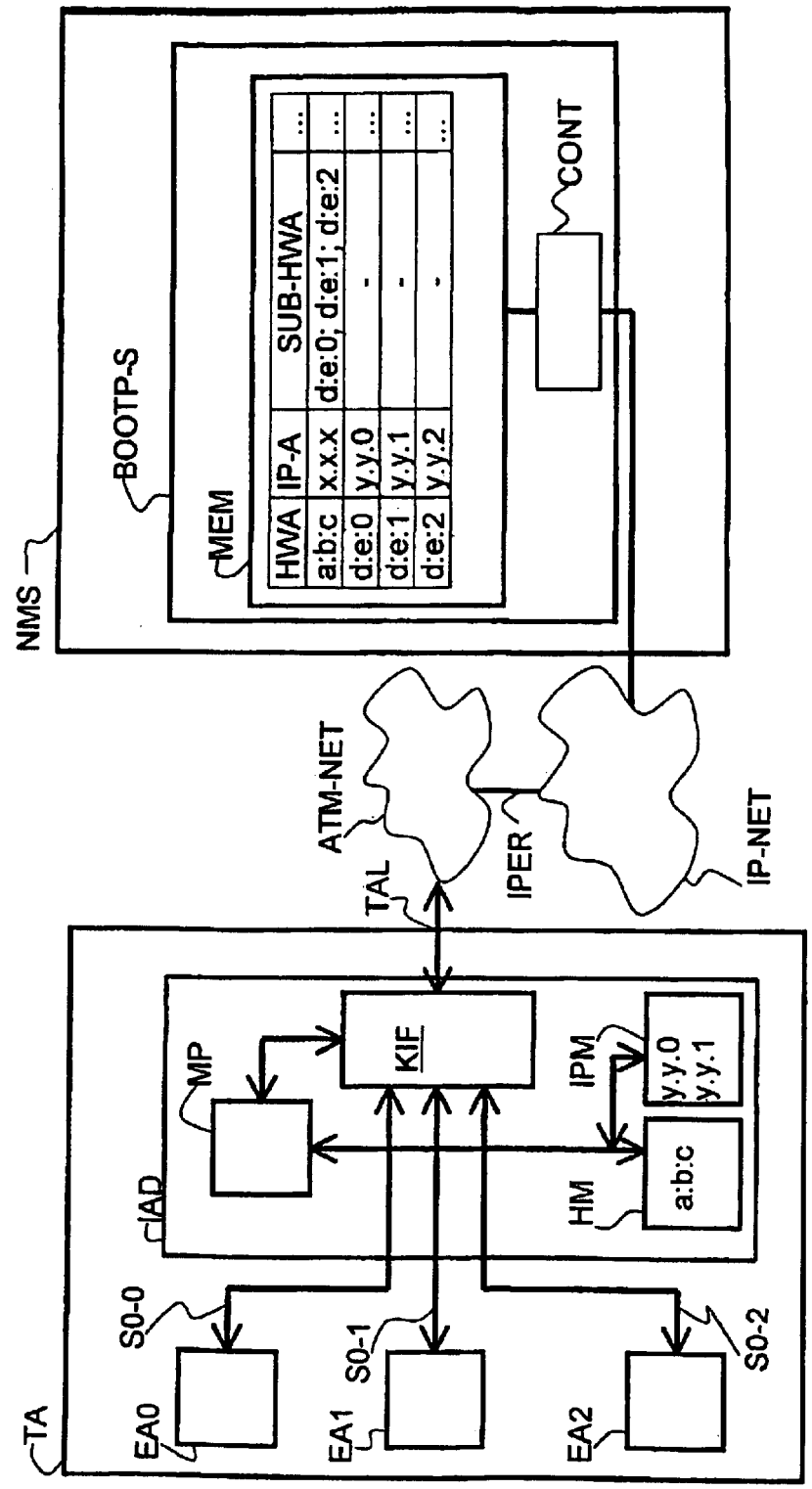

METHOD AND ARRAY FOR DETERMINING THE VIRTUAL ADDRESS OF A TERMINAL

This application claims priority to International Application No. PCT/DE02/00223 which was published in the German language on Aug. 22, 2002.

TECHNICAL FIELD OF THE INVENTION

The invention relates to a method for determining a virtual address that can be assigned to a terminal unit connected to a virtual network on the subscriber side via a terminal interface and a network termination unit, and an array suitable for such a method.

BACKGROUND OF THE INVENTION

Currently the best-known virtual network in which virtual addresses are used is the internet protocol network or IP network. In an IP network, i.e. in a network that uses the TCP/IP protocol, each item of network equipment up to the terminal unit requires a unique virtual address, the internet protocol address or IP address. An IP address that is generated from a network address and a device address comprises, in IP Version 4 (IP v4), four numbers (octets) that are separated by a full stop, e.g. 75.214.64.x. In later IP versions, more octets are used for IP addresses. IP addresses can be generated manually and permanently assigned to items of network equipment including the terminal units in a network. The IP address for an item of network equipment is required to transmit information via the internet protocol specifically to this item of network equipment. Manually configuring IP networks is, however, time consuming and only of interest for small subnetworks that are seldom changed.

To automate IP address assignment, network operators usually therefore use a bootstrap protocol BOOTP or a dynamic host configuration protocol DHCP. BOOTP is a TCP/IP protocol that can be used by items of network equipment to determine their IP address or other network information such as server addresses and gateway information. When an item of network equipment is started, a boot request query is sent in a UDP packet (user data protocol, an non-reliable protocol from the TCP/IP protocol suite) to the BOOTP server that returns the required IP address with a boot response message. The boot request and boot response messages use an IP broadcast function, which can be used to send messages before the specific IP address is known. Such a method is described in detail, for example, in U.S. Pat. No. 6,115,545.

DHCP is another software program for automatically assigning IP addresses to items of network equipment that log into a TCP/IP network. DHCP software usually runs on servers and such a DHCP server is, for example, described in U.S. Pat. No. 5,884,024.

To issue an IP address, BOOTP servers or DHCP servers require a hardware address of an item of network equipment that is transmitted from the network interface of this item of network equipment in the IP address query message, such as the boot request, to the appropriate server.

In networks operating on the Ethernet standard, the hardware address (MAC address) of the Ethernet card forming the subscriber-side network termination unit at a network interface in bus structure data networks is used as a uniquely assignable identifier for each IP address query and IP address reply (boot request, boot response).

In telecommunications networks that are part of an IP network, a hardware address of a subscriber-side network interface of an item of network equipment is mostly used as a uniquely assignable identifier for each IP address query and IP address reply (boot request, boot response) of this item of network equipment. Such a pseudo-hardware address on the subscriber side need not necessarily be assigned to the terminal array, but instead may because of the additional effective transmission technology in the telecommunications network be assigned to the subscriber line or a subscriber-side network terminal unit. If on the subscriber side of such a network termination unit, several termination units are each connected via a separate telecommunications interface, then each of these requires an individual IP address.

Such a network termination unit in a telecommunications network that terminates an IP network on the subscriber side of the subscriber line of a telecommunications network, is used to multiplex different communication technologies on the subscriber side on an individual telecommunications network connection and to de-multiplex the data streams coming from the network into the associated channels. Such network termination units are often referred to as integrated access devices or IADs. A telecommunications network connection to connect an IAD can be an analog telephone connection, an ISDN connection, a DSL connection or a T1 connection. An IAD can also be part of a private branch exchange that provides a number of ISDN S0-bus connections or POTS subscriber line units on the subscriber side. Such private branch exchanges (PBXs) are also known as switches. Currently, IAD units are most commonly used to multiplex voice and data via a DSL connection. DSL denotes a digital subscriber line that is not activated as an ISDN connection using switching technology, but is permanently connected and supplied with voice information and data information via a central item of network equipment, a DSLAM (DSL Access Multiplexer). The digital subscriber lines (DSL) of a particular local area go out from such a DSLAM that is usually part of a peripheral network node. A specific subscriber line data record (port data) is often stored for each subscriber line in the DSLAM and configured by central network management.

Network operators can, for example, use SNMP over IP to centrally manage items of network equipment such as DSLAMs or IADs in an IP network. SNMP stands for Simple Network Management Protocol. This is a widely distributed network monitoring and control protocol. To manage an item of network equipment, the network operator must assign a static IP address to the associated network management interface that can be used to exchange network management messages. The IP router and the network management system within the IP network of the network operator must also know this IP address. Network operators use one of the BOOTP or DHCP protocols as mentioned above to achieve this, The unique identifier to set an IP address in a BOOTP server or DHCP server is usually the hardware address of the item of network equipment. The corresponding IP address, since it is also used for management purposes, is also known as the management IP address.

When setting up an item of network equipment, the network operator must enter the required information in the BOOTP server with the hardware address of the internet protocol interface of the appropriate network array of the item of network equipment used and its IP address to be assigned. For subscriber-side terminal units to be connected to an IAD unit by the subscriber via a telecommunication terminal interface such as a DSL connection, an ISDN S0-bus or a POTS subscriber line unit, either the exact hardware address of the terminal unit has to be entered manually by the subscriber before the unit is set up, or the subscriber has to register the hardware address by telephone or post with the network operator after the terminal unit has been set up at the subscriber premises. Often, IP terminal units are connected on the subscriber side via telecommunication interfaces such as ISDN S0-bus connections or POTS subscriber line units via an IAD unit and, for example, via a telecommunications network to an IP network. (POTS stands for Plain Old Telecommunication System and designates analog line telephony or data transfer in accordance with an analog line modem standard such as V.90). Currently, the only solution in such a case is for the subscriber to register the hardware address of the terminal unit. The two methods of registering that have been described are very labor intensive, require coordination between the subscriber and the network operator, are prone to errors and can lead to unacceptable delays in the availability of the service once the terminal unit has been installed at the subscriber premises. In addition, the subscriber has to register each individual terminal to be connected via such an S0-bus connection or such a POTS subscriber line unit with the central IP network management. Such a terminal unit might, for example, be an H.323 video telephone with a communications interface adapted for the subscriber line. It may also be a computer, a fax or an IP telephone with the appropriate communications interface.

SUMMARY OF THE INVENTION

An object of the invention is to provide a more advantageous procedure to assign virtual addresses for terminal units connected via terminal interfaces and a network termination unit to an IP network and suitable arrays for this.

According a first aspect of the invention, a method for determining a virtual address that is uniquely assigned to a subscriber-side terminal unit connected via a terminal connection and a subscriber-side network termination unit of a virtual network, includes a network termination unit sends an address request message with a unique identifier of the network termination unit to a network management unit to assign virtual addresses in order to request the virtual address of the network termination unit, the network management unit assigns the virtual address to the network termination unit using the unique identifier, the network management unit sends this virtual address of the network termination unit and a unique second identifier of the downstream terminal connection to the network termination unit, the network termination unit sends an address request message with the unique second identifier of the downstream terminal connection to the network management unit to assign virtual addresses, the network management unit assigns the second virtual address to the downstream terminal connection using the second identifier, the network management unit sends this second virtual address of the downstream terminal connection to the network termination unit, and this second virtual address of the downstream terminal connection is transmitted as the virtual address for the terminal unit to the terminal unit.

According to a second aspect of the invention, a method for determining a virtual address that is uniquely assigned to a subscriber-side terminal unit connected via a terminal connection and a subscriber-side network termination unit of a virtual network, includes:

a network termination unit sends an address request message with a unique identifier of the network termination unit to a network management unit to assign virtual addresses in order to request the virtual address of the network termination unit, the network management unit assigns the virtual address to the network termination unit using the first identifier assigned thereto, the network management unit sends this virtual address of the network termination unit and a unique second identifier of the downstream terminal connection to the network termination unit, the unique identifier of the downstream terminal connection is transmitted to the subscriber-side termination unit, the subscriber-side termination unit sends an address request message with the unique second identifier of the downstream terminal connection to the network management unit in order to assign virtual addresses, the network management unit assigns the second virtual address to the downstream terminal connection using the second identifier, the network management unit sends this second virtual address of the downstream terminal connection to the subscriber-side network termination unit, and this second virtual address of the downstream terminal connection is adopted as the virtual address for the terminal unit.

The network termination unit preferably requests its own virtual address using the address request message with its own unique identifier from the network management unit in order to assign virtual addresses. Since the network termination unit is not a terminal, its virtual addresses are only required for network management purposes. If the virtual network is an IP network, such an IP address is therefore also known as a management IP address. Using this virtual address of the network termination unit, the network management unit also preferably sends a unique identifier of the terminal connection to the network termination unit to assign virtual addresses. Since this identifier is assigned to the terminal connection and not to the terminal unit, it is possible to configure an existing subscriber-side sub-network comprising a network termination unit, terminal connection and terminal unit in a central network management facility independent of any specific terminal unit. In particular, it is possible in a further aspect of the invention, to provide such a subscriber-side network with a number of terminal connections and to send a unique hardware identifier, such as a pseudo-media access control (MAC) address formatted in accordance with the IEEE standard 802, to the network termination unit together with its own virtual address for each of these terminal connections.

According to a further aspect of the invention, a method provides for a memory array in order to store the second identifiers of the subscriber-side downstream terminal connections received by the network management unit to issue virtual addresses. A second identifier stored in this way can, for example, then be transmitted from the network termination unit to the appropriate terminal unit connected to one of these terminal connections and adopted by this terminal unit as a specific second identifier. In such a setup, in accordance with the second aspect of the invention, such a terminal unit can send an address request message with this unique identifier of the terminal connection to the network management unit in order to assign IP addresses. Suitable terminal units must permit non-permanent identifiers, i.e. subsequent entry of a pseudo MAC address.

According to another aspect of the invention, a method provides for sending an address request message with the appropriate unique second identifier for each of the subscriber-side downstream terminal connections to the network management unit in order to assign virtual addresses.

A suitable network termination unit for this has a communications interface to connect to a virtual network via a subscriber line of a telecommunications network, an identifier memory array to store its own first unique identifiers and a controller. This controller is used to send an address request message using the stored first identifier via the communications interface, to receive a first virtual address of the network termination unit and a unique second identifier of a subscriber-side terminal connection connected to the network termination unit, to send an address request message using this unique second identifier of the terminal connection via the communications interface, to receive a virtual second address of the terminal connection and to transmit the virtual second address of the terminal connection to a terminal unit connected to this terminal connection.

Preferably, such a network termination unit has a memory array in order to store the second addresses of the subscriber-side downstream telecommunications terminal connections received by the network management unit. In such a case, the virtual second addresses can be determined for all the terminal connections when initializing the network termination unit and, if required, transmitted to any terminals connected to these terminal connections such as for subsequent connections. If a terminal is changed at a terminal connection, then the virtual second address issued for the terminal connection can be directly transmitted to the terminal that is then connected. If an older terminal unit is to be used, then the virtual address issued for the terminal connection on the subscriber side can be configured as the permanent virtual address of the terminal unit.

A particularly suitable network management unit for a method according to the invention for assigning virtual addresses has memory facilities to store first and second identifiers that are uniquely assigned to network elements, to store first and second virtual addresses assigned to these first and second identifiers and to store a second identifier assigned to such a first identifier. Such a network management unit also preferably has a controller to receive such a first identifier of an address request message containing an item of network equipment from this item of network equipment, to determine the first virtual address assigned to this first identifier and the second identifier assigned to this first identifier and to send this first virtual address and this second identifier to the appropriate item of network equipment.

Known network management units in an IP network for assigning IP addresses forward to an item of network equipment, from which it receives an IP address request message, in addition to the identifier contained in the request message and the requested IP addresses only information relating to network elements between the network management unit and the requesting item of network equipment. However, a network management unit according to the present invention also transmits an identifier of a unit downstream of the item of network equipment on the subscriber side. To achieve this in the case of the internet protocol, the current boot protocol must be extended by a suitable parameter in the answer message from the network management unit (NME).

The unique identifier of the network termination unit is for example the hardware or MAC address of this network termination unit. If the network termination unit of the virtual network is a network termination unit connected to the virtual network via a subscriber line of a telecommunications network, then, as explained above, the unique identifier of the network termination unit can also be a pseudo-hardware address that is assigned to the subscriber line of this network termination unit. Such a pseudo-hardware address of the subscriber line can for example be stored in the network-side peripheral area of the telecommunications network when the subscriber line is configured and can be transmitted via the subscriber line to the network termination unit when the network termination unit is initialized. Such a method has the advantage that the first virtual address of the network termination unit can be configured independently from any hardware.

According to yet another aspect of the invention, a method for a pseudo-hardware address assigned to a terminal connection as the unique identifier of each of these terminal connections is provided. This method is applicable if the terminal connection can be addressed independently from the virtual address that is, for example, if there are connection-oriented telecommunications terminal connections. This pseudo-hardware address is stored in addition to the first virtual address of the network termination unit and to the unique identifier of the network termination unit in the network management unit in order to issue virtual addresses so that in the event of an address request message containing the identifier of a network termination unit it will be sent to the network termination unit in addition to the first virtual address of the network termination unit. In this case, all the virtual addresses required on the subscriber side can be determined in the virtual network when the network termination unit is configured. The hardware addresses of individual terminals are not required. The number and address of the subscriber-side telecommunications terminal connection downstream of the network termination unit remain fixed during commissioning of a subscriber-side subnetwork and usually remain constant over a long period.

If a network termination unit on the subscriber side has several terminal connections to connect terminal units of the virtual network downstream, then in accordance with a further aspect of the invention, unique identifiers of these terminal connections can be sent from the network management unit to the network termination unit to determine virtual addresses. For each of these terminal connections, an address request message with the unique second identifier of the downstream terminal connection may be sent to the network management unit in order to assign virtual addresses. It is clear that the above description of the array and method are particularly suitable for determining an IP address that is to be assigned to a terminal unit connected to an IP network, for example, via a telecommunications terminal interface and a network termination unit In the following, the invention will be explained in greater detail on the basis of preferred exemplary embodiments, making reference to the attached drawings.

BRIEF DESCRIPTION OF THE DRAWINGS

FIG. 3 shows a schematic diagram of an internet protocol network as per FIG. 1 with a network termination unit according to the present invention and with a bootstrap protocol server as a preferred embodiment of network management unit to assign IP addresses.

DETAILED DESCRIPTION OF THE PREFERRED EMBODIMENTS

Figure 1:
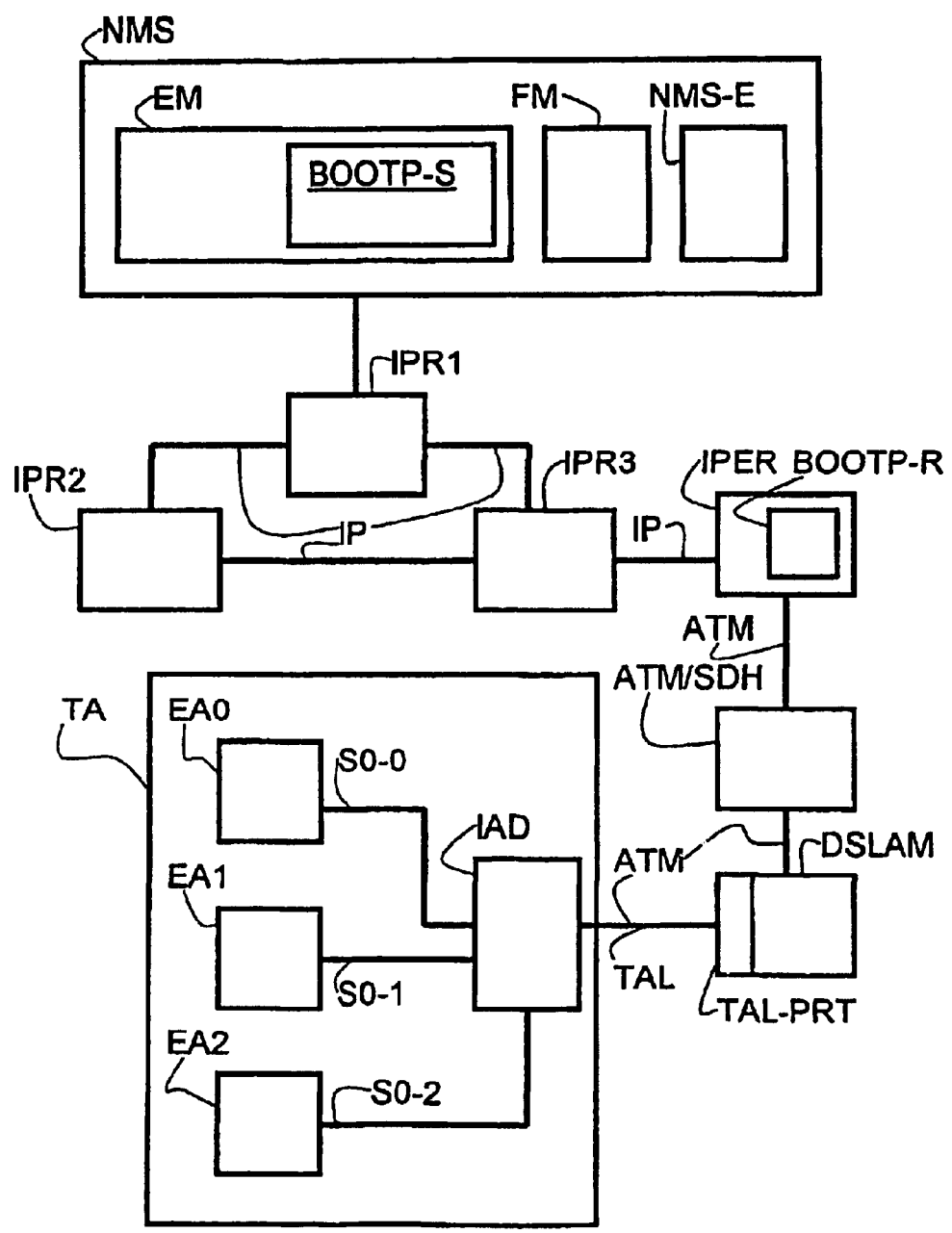
FIG. 1 shows a schematic diagram of components of an internet protocol network in which the method according to the present invention can be used.

FIG. 1 shows a network management system (NMS) of an internet protocol network with an element management unit (EM), a fault management unit (FM) and a network management system entry unit (NMS-E) to be operated by an operator. The element management unit (EM) includes (alongside other subunits not shown separately) a bootstrap protocol server (BOOTP-S) as a network management unit to assign IP addresses. The network management system (NMS) is connected via a LAN connection to the internet protocol data network that is represented by three internet protocol routers (IPR1, IPR2 and IPR3) and a network gateway internet protocol router (IPER). Information is exchanged between the routers (IPR1, IPR2, IPR3 and IPER) of this network area based on the internet protocol IP.

A network gateway internet protocol router (IPER), (also known as an edge router by analogy with edge devices) is equipped with an ATM card (not shown) and enables information to be transmitted using asynchronous transfer mode (ATM) from the internet protocol network to the telecommunications network. In the embodiment shown, the network gateway internet protocol router (IPER) is connected in accordance with the ATM/SDH standard to an ATM network the peripherals of which include a digital subscriber line access multiplexer (DSLAM). The network gateway internet protocol router (IPER) includes a bootstrap protocol relay function (BOOTP-R), which is responsible for delivering bootstrap protocol messages to among others the DSLAM network element, network termination units (IAD) and the network management system. As the network gateway internet protocol router (IPER) undertakes the role of an internet protocol relay, it is also known as the relay router (IPER).

The digital subscriber line access multiplexer (DSLAM) has subscriber line ports (TAL-PRT) from which the subscriber lines (TAL) go out. In the figure, only one subscriber line (TAL) is shown as being connected with a network termination unit (IAD) of a subscriber-side subnetwork (TAM. Between the network gateway internet protocol router (IPER) and the network termination unit (IAD), and to every other network termination unit not shown in the diagram, permanent virtual ATM connections (known as ATM-PVCs) have been set up. Via these virtual ATM connections, information and control commands from the network management system (NMS) based on the SNMP explained above can be transmitted from the network gateway internet protocol router (IPER) to the network termination unit; With regard to the management channel between the network management system (NMS) and the network termination unit (IAD), the network gateway Internet protocol router (IPER) only has a switching function.

In addition to the network termination unit (IAD), the subscriber-side subnetwork (TA) shown in FIG. I comprises three further terminal units (EA0, EA1 and EA2) that are each connected via an S0 interface (S0-0, S0-1, S0-2) to the network termination unit (IAD).

Figure 2A:
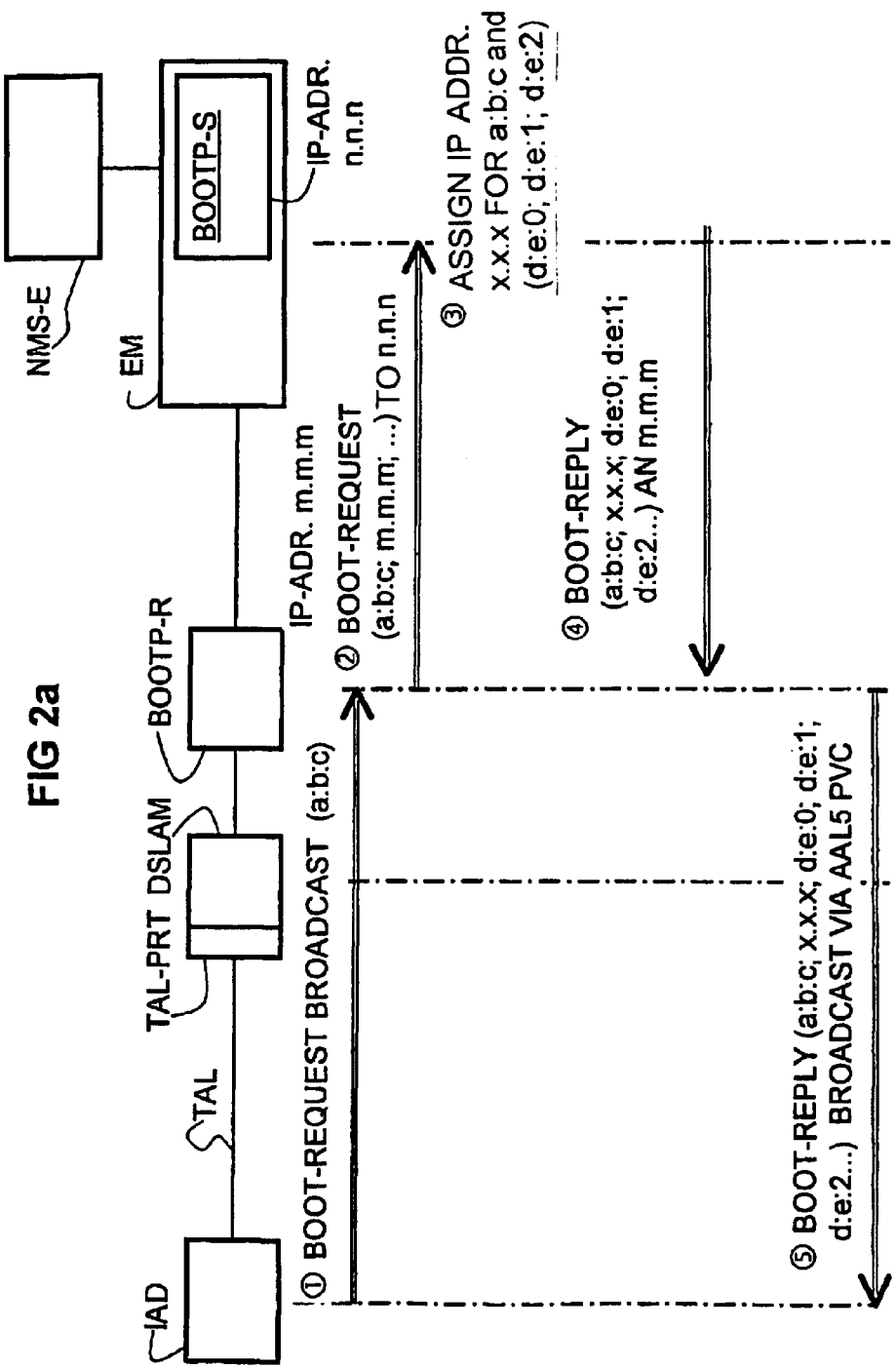
FIGS. 2a and 2b show schematic diagrams of the process of a method according to the present invention with reference to a network configuration as per FIG. 1.
Figure 2B:
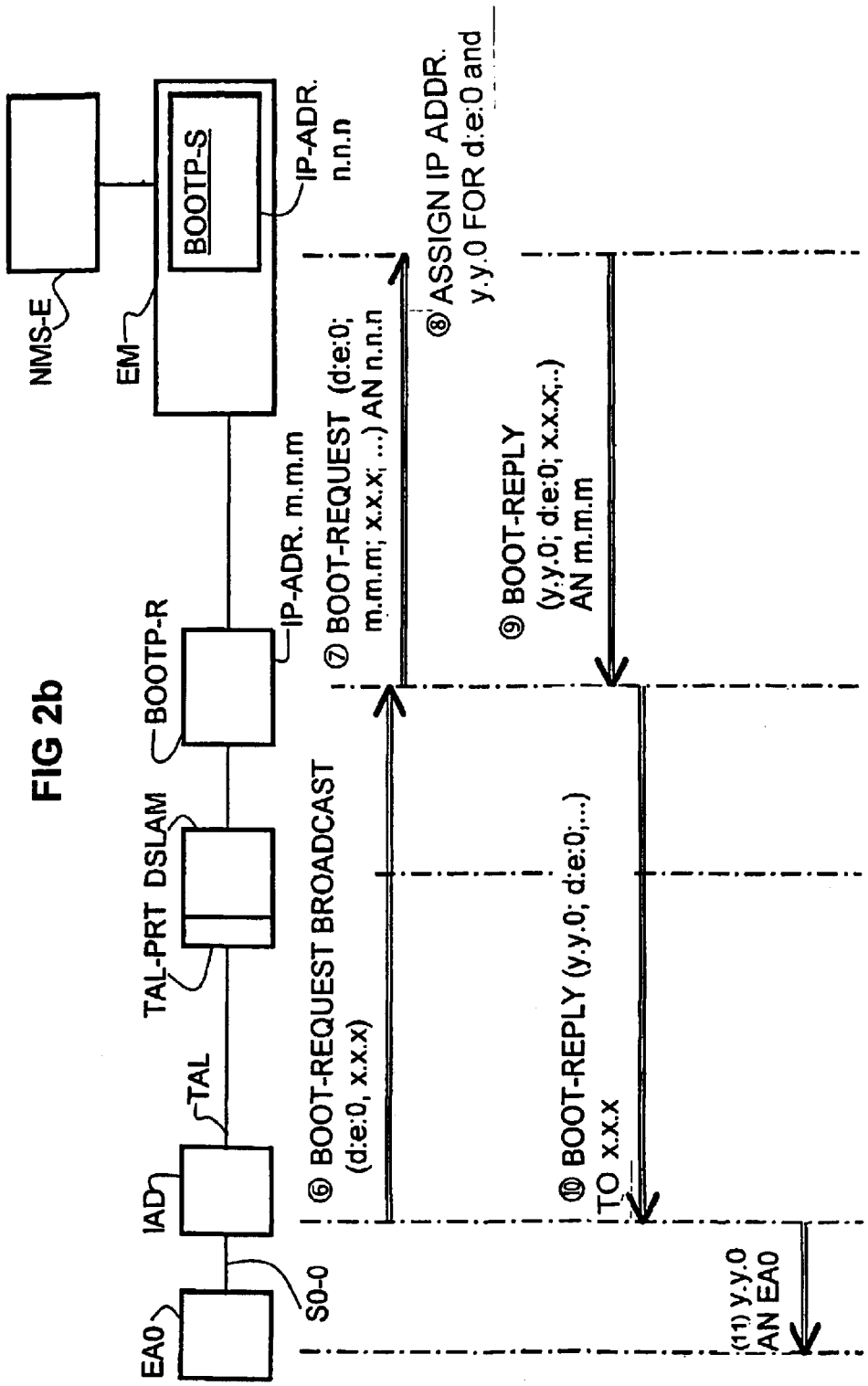

FIGS. 2a and 2b show some components from FIG. 1 and steps of a preferred embodiment of a method according to the present invention.

FIGS. 2a and 2b show in detail, as functional units, the network management system entry unit (NMS-E), the element management unit (EM) with the bootstrap protocol server (BOOTP-S) and the internet protocol address (n.n.n), the bootstrap protocol relay function BOOTP-R of the network gateway internet protocol router with the internet protocol address (m.m.m), the digital subscriber line access multiplexer (DSLAM) with the subscriber line port (TAL-PRT), the subscriber line (TAL) and the network termination unit (IAD). FIG. 2b also shows a terminal unit (EA0) and the S0-interface connected with the network termination unit (IAD).

In step 1, the network termination unit (IAD), using a broadcast function, sends an IP address request message (boot request) with the hardware address (a:b:c) as a unique identifier of the network termination unit (IAD) to the bootstrap protocol relay function (BOOTP-R).

In step 2, the bootstrap protocol relay function (BOOTP-R) sends an IP address request message (boot request) with the hardware address (a:b:c) and with its own internet protocol address (m.m.m) to the internet protocol address (n.n.n) of the network management system (NMS), in particular to the bootstrap protocol server (BOOT?-S).

In step 3, in accordance with a prior configuration of the network termination unit (IAD), the bootstrap protocol server (BOOTP-S) assigns the internet protocol address (x.x.x) and the pseudo-hardware address (d:e0, d:e:1 and d:e:2) as a unique identifier of the telecommunications terminal connections (S0-0, S0-1 and S0-2) for the hardware address (a:b:c).

In step 4, this internet protocol address (x.x.x) with the hardware address (a:b:c), with the pseudo-hardware address (d:e:0, d:e:1 and d:e:2) and additional server information in a bootstrap protocol answer message (boot reply) is transmitted to the internet protocol address (m.m.m) of the bootstrap protocol relay function (BOOTP-R). The bootstrap protocol relay function (BOOTP-R) sends this received message using a broadcast function via the virtual ATM connection (AAL5 PVC) in step 5 to the network termination unit (IAD).

In the embodiment according to FIGS. 2a and 2b, it is assumed thereafter that the network termination unit (IAD) requests the IP address for each of the terminal units (EA0, EA1 and EA2) and transmits these IP addresses to the appropriate terminal units. FIG. 2b shows this process for the terminal unit EA0. Of course, in another embodiment of the method in accordance with the present invention not explicitly presented, the network termination unit (IAD) can transmit to the terminal units (EA0, EA1 and EA2) in accordance with step 5 of the method as per FIG. 2a the pseudo-hardware addresses (d:e:0, d:e:1 or d:e:2) of the telecommunications terminal connections (S0-0, S0-1 and S0-2) assigned to them, and each of the terminal units (EA0, EA1 and EA2) could, in accordance with the aforementioned steps 1 to 5 described for the network termination unit, send an IP address request message (boot request) using the appropriate pseudo-hardware address (d:e:0, d:e:1 or d:e:2).

In step 6, the network termination unit (IAD), using a broadcast function, sends an IP address request message (boot request) with the pseudo-hardware address (d:e:0) as a unique identifier of the telecommunications terminal connection (S0-0) and hence the terminal unit (EA0) and with its own internet protocol address (x.x.x) to the bootstrap protocol relay function (BOOTP-R). If the network termination unit (IAD) has available the IP address (n.n.n) of the bootstrap protocol server (BOOTP-S), the request can also be sent to the bootstrap protocol server (BOOTP-S). The method according to step 6 however requires fewer changes to existing protocols. Sending the IP address (x.x.x) of the network termination unit (IAD) is not compulsory for carrying out the method. By transmitting this IP address (x.x.x), the broadcast function in step 5 of the method as per FIG. 2a used to deliver the expected bootstrap protocol reply message (boot reply) to the network termination unit (IAD) need not be used.

In step 7, the bootstrap protocol relay function (BOOTP-R) sends an IP address request message (boot request) with the pseudo-hardware address (d:e:0) and with its own internet protocol address (m.m.m) and optionally with the IP address (x.x.x) of the network termination unit (IAD) to the internet protocol address (n.n.n) of the network management system (NMS), in particular to the bootstrap protocol server (BOOTP-S).

In step 8, the bootstrap protocol server (BOOTP-S) assigns the internet protocol address (y.y.0) to the telecommunications terminal connection (S0-0) and hence the terminal unit (EA0) for the hardware Address (d:e:0).

In step 9, this internet protocol address (y.y.0) with the pseudo-hardware address (d:e:0), additional server information and optionally with the IP address (x.x.x) of the network termination unit (IAD) is transmitted in a bootstrap protocol reply (boot reply) to the internet protocol address (m.m.m) of the bootstrap protocol relay function (BOOTP-R). In step 10, the bootstrap protocol relay function (BOOTP-R) sends this received message to the network termination unit (IAD).

In step 11, the network termination unit (IAD) transmits the IP address (y.y.0) via the telecommunications terminal connection (S0-0) to the terminal unit (EA0).

FIG. 3 shows a subscriber-side subnetwork (TA) that (as in FIG. 1) comprises a network termination unit (IAD) and three terminal units (EA0, EA1 and EA2) that are each connected via an SO interface (S0-0, S0-1, S0-2) with the network termination unit (IAD). In the network termination unit (IAD) in FIG. 3, a communications interface (KIF) is also shown to which a subscriber line (TAL) is connected and the three S0 interfaces (S0-0, S0-1 and S0-2) to connect the terminal units (EA0, EA1 and EA2). The communications interface (KIF) is also connected to a control unit (MP). The communications interface (KIF) forwards the information and commands received on the subscriber line (TAL) to the SO interfaces (S0-0, S0-1 and S0-2) and to the control unit (MP) that processes this information and these commands. Any format conversions or demultiplexing processes that are required are carried out by the communications interface (KIF). Similarly, the communications interface (KIF) should multiplex or convert the format of any information or commands received from the control unit (MP) or via the individual S0-interfaces (S0-0, S0-1 and S0-2) so that these can be transmitted to the subscriber line (TAL) in a telecommunications network (ATM-NET) shown schematically in FIG. 3. The control unit (MP) of the network termination unit (IAD), which is usually a processor unit with the appropriate program commands, controls the communications interface (KIF) and is in read communication with a hardware address storage (HM) where the hardware address (a:b:c) is stored. The control unit (MP) is also in read/write connection with a memory facility (IPM) to store IP addresses (y.y.0, y.y.1 and (not shown) y.y.2) of the terminal connections (EA0, EA1, and EA2) connected to the S0 interfaces(S0-0, S0-1 and S0-2). This memory facility (IPM) can also, if required, be used to store pseudo-hardware addresses (d:e:0. d:e:1 and d:e:2) assigned to the S0 interfaces (S0-0, S0-1 and S0-2).

As already mentioned, the subscriber-side subnetwork (TA) shown in FIG. 3 is connected via a subscriber line (TAL) to a telecommunications network (ATM-NET). This telecommunications network (ATM-NET) is integrated via a network gateway internet protocol router (IPER) into an internet protocol network (IP NET) shown as a connection line that is controlled and managed by a network management system (NMS) of the internet protocol network (IP NET).

Such a network management system (NMS) is arranged in accordance with the diagram and description in FIG. 1, although in FIG. 3 only one bootstrap protocol server (BOOTP-S) is shown as a network management unit for assigning IP addresses. The bootstrap protocol server (BOOTP-S) contains a control unit (CONT) to control the IP address management and a memory array to store identifiers (HWA), such as the hardware address (a:b:c) or the pseudo-hardware addresses (d:e:0, d:e:1 or d:e:2), IP addresses IP-A such as (x.x.x, y.y.0, y.y.1 or y.y.2), downstream pseudo-hardware addresses (SUB-HWA) such as (d:e:0, d:e:1 d:e:2) and other information (shown as a dotted line) such as gateway or server information.

If the invention has been described for the internet protocol network and the IP address release, this is only by way of example and not meant to be restrictive. From this description of the present invention a person skilled in the art will deduce many arrangements and versions in terms of the scope of protection of the claims.

What is claimed is:

1. A method for determining a virtual address that is uniquely assigned to a subscriber-side terminal unit connected to a virtual network via a subscriber-side network termination unit of a subscriber line of the virtual network and to a terminal connection downstream of the network termination unit, comprising:

sending an address request message from the network termination unit with a unique first identifier of the network termination unit to a network management unit to assign virtual addresses in order to request a virtual address of the network termination unit;

assigning the virtual address of the network termination unit using the first identifier by the network management unit;

sending the virtual address of the network termination unit and a unique second identifier of the downstream terminal connection from the network management unit in order to assign virtual addresses to the network termination unit;

sending an address request message with the unique second identifier of the downstream terminal connection from the network termination unit to the network management unit in order to assign virtual addresses;

assigning the virtual address of the downstream terminal connection using the identifier by the network management unit, sending the virtual address of the downstream terminal connection from the network management unit in order to assign virtual addresses to the network termination unit; and transmitting the virtual address of the downstream terminal connection as the virtual address for the terminal unit to the terminal unit.

2. A method for determining a virtual address that is uniquely assigned to a subscriber-side terminal unit connected to a virtual network via a subscriber-side network termination unit of a subscriber line of the virtual network and to a terminal connection downstream of the network termination unit, comprising:

sending an address request message from the network termination unit with a unique first identifier of the network termination unit to a network management unit to assign virtual addresses in order to request a virtual address of the network termination unit; and assigning the virtual address of the network termination unit using the said first identifier by the network management unit, sending the virtual address of the network termination unit and a unique second identifier of the downstream terminal connection from the network management unit in order to assign virtual addresses to the network termination unit;

transmitting the unique second identifier of the downstream terminal connection to the subscriber-side terminal unit; and sending an address request message with the unique second identifier of the downstream terminal connection from the subscriber-side terminal unit to the network management unit in order to assign virtual addresses;

assigning the virtual address of the downstream terminal connection using the said identifier using the network management unit;

sending this virtual address of the downstream terminal connection from the network management unit in order to assign virtual addresses to the subscriber-side terminal unit; and accepting the virtual address of the downstream terminal connection as the virtual address for the terminal unit.

3. The method according to claim 1 or 2, wherein the virtual network is an IP network, the address request messages are IP address request messages and the virtual addresses are IP addresses.

4. The method according to claim 3, wherein the first unique identifier of the network termination unit is a hardware MAC address of the network termination unit.

5. The method according to claims 1 or 2, wherein the network termination unit is a network termination unit of a telecommunications network forming part of the virtual network with subscriber lines, and the first unique identifier of the network termination unit is a pseudo-hardware address of the subscriber line of the network termination unit.

6. The method according to claim 5, wherein the first unique identifier of the network termination unit is stored in a network-side peripheral area of the telecommunications network when the subscriber line is configured and is transmitted via the subscriber line to the network termination unit when the network termination unit is initialized.

7. The method according to claims 1 or 2, wherein the downstream terminal connection is a telecommunications terminal connection and the second unique identifier of the telecommunication terminal connection is a pseudo-hardware address assigned thereto that is stored in addition to the first virtual address of the network termination unit and to the first unique identifier of the network termination unit in the network management unit.

8. The method according to claims 1 or 2, wherein several second unique identifiers of the appropriate terminal connections are sent from the network management unit to assign virtual addresses to the network termination unit, and for each of these terminal connections, an address request message with the unique second identifier of the terminal connection is sent to the network management unit to assign virtual addresses.

9. A network termination unit with a communications interface to connect to a virtual network with an identifier memory array to store a first unique identifier of the network termination unit comprising: a controller to send an address request message using the stored first unique identifier via the communications interface, to receive a first virtual address of the network termination unit and a second unique identifier of a subscriber-side terminal connection connected with the network termination unit, to send an address request message using the second unique identifier of the terminal connection via the communications interface, to receive a second virtual address of the terminal connection and to transmit the IP address of the terminal connection to a terminal unit connected to the terminal connection.

10. The network termination unit according to claim 9, wherein the virtual network is an IP network, the address request messages are IP address request messages and the virtual addresses are IP addresses.

11. A network management unit to assign virtual addresses, comprising:

memory facilities to store first and second identifiers that are uniquely assigned to network elements, to store first or second virtual addresses assigned to these first and second identifiers, and to store a second identifier, assigned to such a first identifier; and a controller to receive an address request message containing first identifier of a network termination unit from the network termination unit, to determine the first virtual address assigned to the first identifier and the second identifier assigned to this first identifier, and to send this first virtual address and this second identifier to the item of network equipment.

12. The network management unit to assign virtual addresses according to claim 11, wherein the address request messages are IP address request messages and the virtual addresses are IP addresses.

* * * * *